United States Patent [19]
Ziu

[11] Patent Number: 5,404,914
[45] Date of Patent: Apr. 11, 1995

[54] CENTERING SUPPORT FOR DOUBLE CONTAINMENT PIPE ASSEMBLY

[75] Inventor: Christopher G. Ziu, P.O. Box 49, Monroe, Conn. 06468

[73] Assignee: Christopher G. Ziu, Merrimack, N.H.

[21] Appl. No.: 885,670

[22] Filed: Aug. 17, 1992

[51] Int. Cl.6 ............................................. F16L 9/18
[52] U.S. Cl. ............................ 138/113; 138/103; 138/104; 138/108; 138/178
[58] Field of Search ................ 138/103, 104, 110, 111, 138/113, 114, 148, 160, 159, 108, 177, 178; 248/49; 174/99 R

[56] References Cited

U.S. PATENT DOCUMENTS

| | | | |
|---|---|---|---|
| 263,627 | 8/1882 | Thayer | 138/108 |
| 269,568 | 12/1882 | Eltonhead | 138/108 |
| 361,276 | 4/1887 | MacFarlane | 138/113 |
| 411,091 | 9/1889 | Carey | 138/113 |
| 1,002,932 | 9/1911 | Richards | 138/18 |
| 2,791,019 | 3/1954 | Du Laney | 138/110 |
| 2,841,203 | 7/1958 | Gronemeyer | 138/160 |
| 2,890,724 | 6/1959 | Kennedy | 138/113 |
| 2,938,569 | 5/1960 | Goodrich | 138/110 |
| 3,374,308 | 3/1968 | Haas | 138/113 |
| 3,999,340 | 12/1976 | Bogese et al. | 138/108 |
| 4,100,367 | 7/1978 | Netzel | 138/113 |
| 4,478,278 | 10/1984 | Klein | 138/113 |
| 4,557,470 | 12/1985 | Link | 138/110 |
| 5,141,184 | 8/1992 | Ziu | 138/115 |

FOREIGN PATENT DOCUMENTS

| | | | |
|---|---|---|---|
| 1432804 | 4/1902 | France | 138/113 |
| 1182580 | 6/1959 | France | 138/160 |
| 119615 | 9/1947 | Sweden | 138/108 |
| 10377 | of 1911 | United Kingdom | 138/110 |

*Primary Examiner*—James E. Bryant, III
*Attorney, Agent, or Firm*—McCormick, Paulding & Huber

[57] ABSTRACT

A centering support for a double containment pipe assembly of an inner pipe located within an outer pipe, has a first half defining a first surface substantially conforming to the outer surface of the inner pipe, and a second half defining a second surface substantially conforming to the outer surface of the inner pipe. The first and second surfaces are seated on the outside surface of the inner pipe, and the first and second halves are coupled together by at least one fastening member for coupling the centering support to the inner pipe.

20 Claims, 3 Drawing Sheets

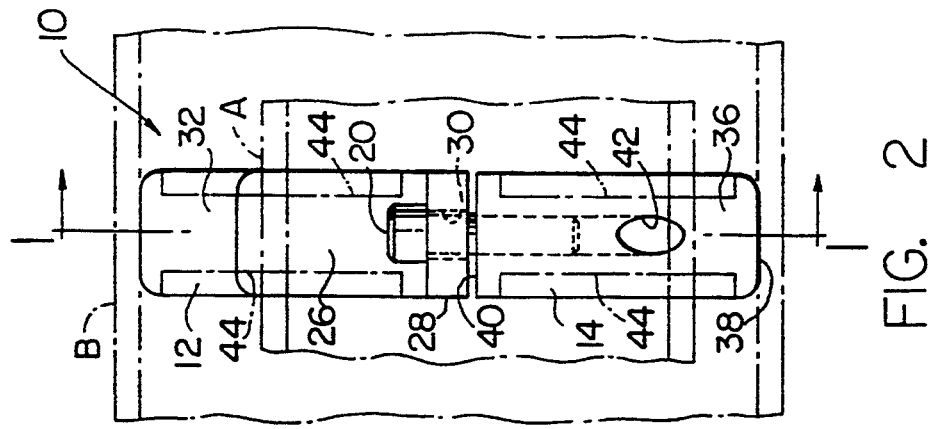
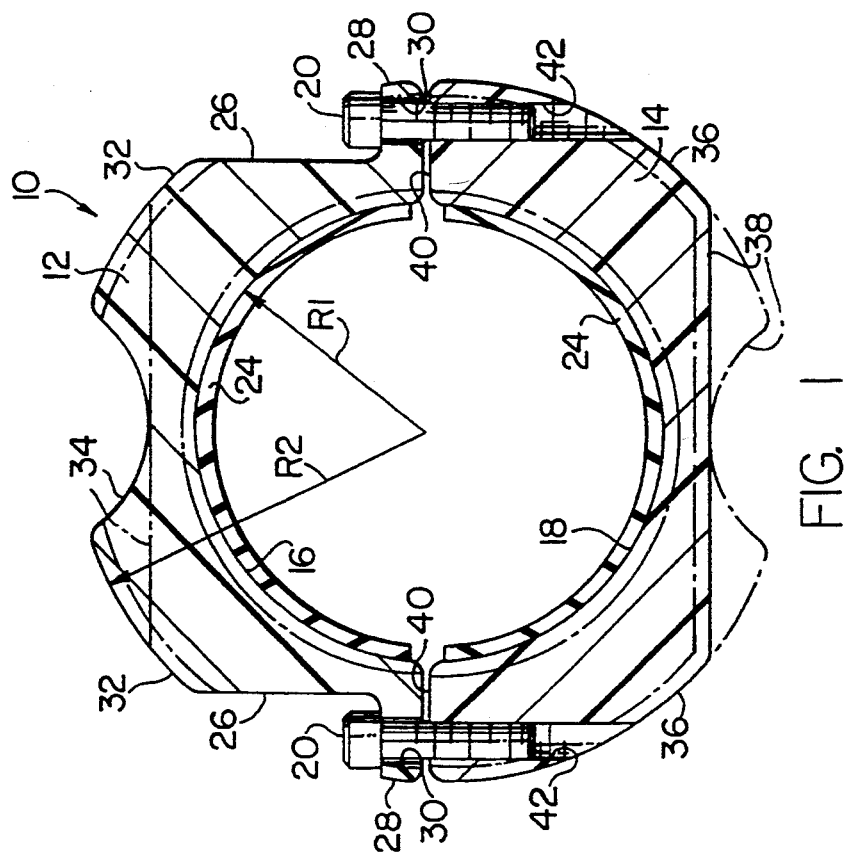

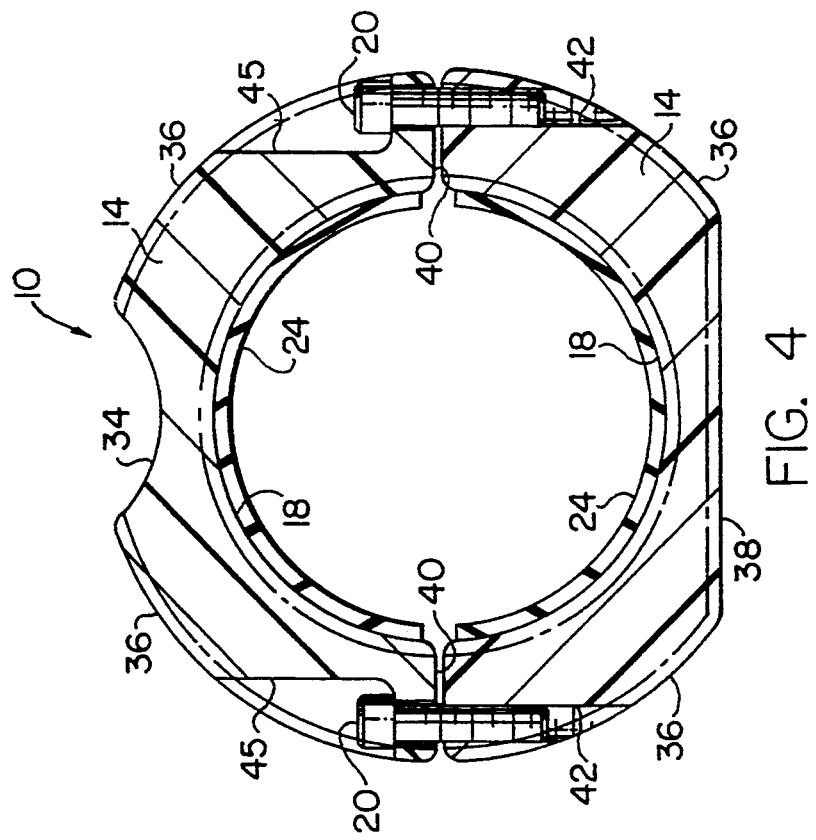
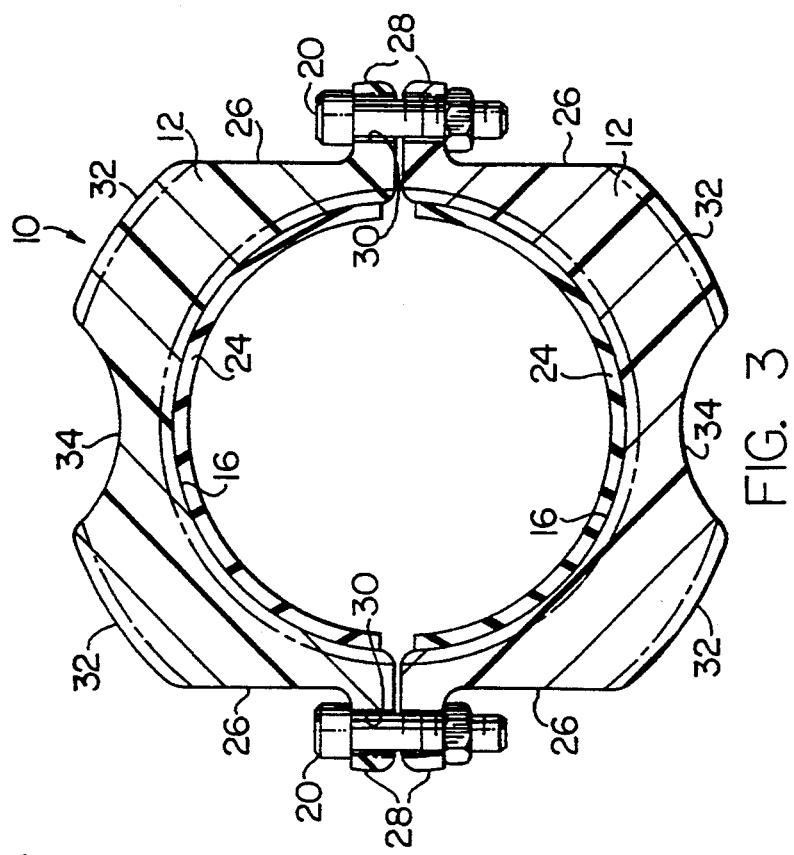

CENTERING SUPPORT FOR DOUBLE CONTAINMENT PIPE ASSEMBLY

FIELD OF THE INVENTION

The present invention relates to double containment pipe assemblies wherein an inner or primary pipe is located within an outer or containment pipe, and more particularly, to support apparatus for supporting an inner or primary pipe within an outer or containment pipe.

BACKGROUND INFORMATION

Hazardous fluids are routinely conveyed within enclosed pipes or conduits. Recognizing that such pipes and conduits can leak due to manufacturing defects, excessive pressure, corrosion, and joint defects, for example, which may be due to thermal stresses, double-containment piping systems have been developed in which an inner or primary pipe is located within an outer or containment pipe forming an annulus between the inner and outer pipes. The annulus is typically dry, except in the event of a leak of fluid carried by the inner pipe. The inner pipe is typically supported by resting directly on the lower, inside wall of the outer pipe. Alternatively, support apparatus are provided in which the inner pipe is supported in spaced relation to the inside wall of the outer pipe. Exemplary supports are illustrated in the following U.S. Pat. Nos. 5,141,184; 5,018,260; 4,751,945; 3,863,679; and 3,417,785.

Although such prior supports may be used to support the inner pipe within the outer pipe, and provide ready access to the inner pipe at spaced locations along the outer pipe, such supports are typically joined to the inner pipe and/or the outer pipe by welding or bonding means to secure the support in place. The welding or bonding process can require significant construction and assembly time, which results in added project costs, and further prolongs the installation time of the double-containment piping system. The welding or bonding process also typically requires that the support be made of the same material as either the inner or the outer pipe so that it can be adequately welded or bonded to the respective pipe. Accordingly, any flexibility in selecting the material for the support is frequently limited by the materials of the inner and outer pipes.

Prior supports also frequently directly support an inadequate portion of the inner pipe in comparison to that which is typically required for single-wall above-ground pipes. For example, there are one-piece collar-type supports which by design fit less than perfectly around the external circumference of the inner pipe, in order to slip the support into position over the inner pipe. This type of collar support is then secured in place typically by welding or otherwise bonding the support to the inner pipe. Thus, although such a support may surround the inner pipe, it typically does not maintain sufficient support of the entire circumference of the inner pipe because its inner diameter is inherently greater than the outer diameter of the inner pipe. This is a particular disadvantage with fiberglass pipes, which typically require uniform support along the entire circumference of the inner pipe.

SUMMARY OF THE INVENTION

The present invention is directed to a centering support for a double-containment pipe assembly including an inner pipe within an outer pipe. The centering support comprises a first half defining a first surface substantially conforming to the curvature of the outer surface of the inner pipe, and a second half defining a second surface substantially conforming to the curvature of the outer surface of the inner pipe. The first and second surfaces are seated on opposite sides of the inner pipe relative to each other on the outside surface of the inner pipe, and the first and second halves are coupled together by at least one fastening member for coupling the centering support to the inner pipe.

In one embodiment of the present invention, the first and second surfaces are substantially defined by a first radius slightly greater than the radius of the outside surface of the inner pipe. The first half further defines a third surface substantially conforming to the curvature of the inside surface of the outer pipe, and the second half further defines a fourth surface substantially conforming to the curvature of the inside surface of the outer pipe.

In one embodiment of the present invention, at least one of the first and second halves includes at least one flange portion for receiving a fastening member for coupling the first and second halves together on the inner pipe. A substantially flat portion is preferably defined adjacent the flange portion to facilitate insertion of a tool to manipulate the fastening member coupled through the flange portion. In one embodiment of the present invention, at least one of the first and second halves includes two flange portions, each being located on a distal end of the respective half for receiving a fastening member for coupling the first and second halves together on the inner pipe.

Preferably, at least one of the third and fourth surfaces includes a void or cut-out for air flow or drainage through an annulus between the inner and outer pipes. A resilient material is also preferably inserted between the first and second surfaces and the inner pipe to facilitate firmly engaging the centering support to the inner pipe, without subjecting the inner pipe to any damaging stress.

In one embodiment of the present invention, the first and second halves are coupled together on one end by a hinge member and coupled together on the other end by the fastening member.

One advantage of the centering support of the present invention, is that because the first and second surfaces of the halves substantially conform to the outer surface of the inner pipe, and the two halves are mechanically coupled together by the fastening member, the centering support is firmly engaged with the inner pipe throughout the circumference of the inner pipe to support the inner pipe. The degree to which the centering support firmly engages the inner pipe is selected by simply adjusting the fastening member.

Another advantage of the centering support of the present invention, is that it does not have to be welded or otherwise bonded to either the inner or outer pipe, but rather is simply mechanically coupled to the inner pipe by the fastening member. This results in significant time savings, and thus cost savings in assembling a double-containment pipe assembly.

Other advantages of the centering support of the present invention will become apparent in view of the following detailed description and accompanying drawings.

BRIEF DESCRIPTION OF THE DRAWINGS

FIG. 1 is cross-sectional view of a centering support embodying the present invention taken along the line 1—1 of FIG. 2.

FIG. 2 is side view of the centering support of FIG. 1.

FIG. 3 is a cross-sectional view of another centering support embodying the present invention formed by coupling together two upper halves of the centering support of FIG. 1.

FIG. 4 is a cross-sectional view of another centering support embodying the present invention formed by coupling together essentially two lower halves of the centering support of FIG. 1.

DETAILED DESCRIPTION

Figure 6:
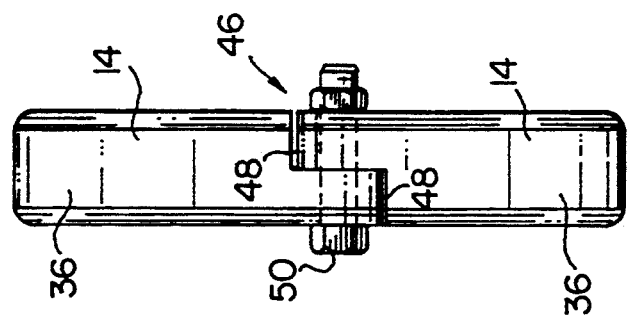
FIG. 6 is a side view of the centering support of FIG. 5.

In FIG. 1, a centering support embodying the present invention is indicated generally by the reference numeral 10. The centering support 10 includes an upper half 12 and a lower half 14. The upper half 12 defines an upper semi-circular surface 16, and the lower half 14 defines a lower semi-circular surface 18. The upper and lower halves 12 and 14 are fitted over a primary pipe A, illustrated in phantom lines in FIG. 2, and coupled together by fasteners 20. In the embodiment of the present invention illustrated, the fasteners 20 are bolts having either socket or allen heads, and threaded portions for attachment to the lower half 14. An elastomeric or other type of resilient material 24 is preferably fitted between the upper and lower semi-circular surfaces 16 and 18, respectively, to facilitate the ability to tightly couple the upper and lower halves onto the primary pipe A. The semi-circular surfaces 16 and 18 are each defined by a radius R1, which is preferably slightly greater than the outside radius of the primary pipe A to permit insertion of the elastomeric material 24 between the primary pipe A and centering support 10.

As shown in FIG. 1, the upper half 12 has a generally omega-shape, which is defined by flats 26 on either side of the upper half relative to each other, a curved top surface 32 extending between the flats 26, and corresponding flange portions 28, each oriented substantially perpendicular to a respective flat 26. Each flange portion 28 defines an aperture 30 for receiving a respective fastener 20. Each flat 26 is substantially parallel to the vertical centerline of the upper half 12 to facilitate insertion of a socket or allen wrench, or other type of tool adjacent the flat to tighten or remove the respective fastener 20.

The surface 32 is defined by a radius R2, which is slightly less than the inside radius of an outer or containment pipe B, illustrated in phantom lines in FIG. 2, to permit insertion of the assembled centering support 10 and primary pipe A within the outer pipe B. The edges of the top surface 32 are preferably beveled, as shown by phantom lines in FIG. 1, to facilitate insertion within the outer pipe B. A generally semi-circular cut-out 34 may be formed within the approximate central portion of the top surface 32 to permit continuous flow of air within the annulus between the primary pipe A and the outer pipe B. The cut-out 34 may take any of numerous shapes to permit the flow of air through the annulus. For example, the cut-out 34 may equally take the shape of a flat or chord, as indicated by phantom lines in FIG. 1. The transition points between the various surfaces are preferably defined by either a smooth radius or fillet, as shown in FIG. 1, to prevent localized stress under load, such as when the fasteners 20 are tightened.

The lower half 14 is generally saddle-shaped, as shown in FIG. 1, and includes a lower surface 36 also defined by the radius R2. The edges of the lower surface 36 are also preferably beveled, as indicated by phantom lines in FIG. 1, to facilitate insertion of the assembled centering support 10 and primary pipe A within the outer pipe B. A flat surface (or chord) 38 may be formed in the approximate central portion of the lower surface 36 to permit the drainage of fluid, if any, through the annulus between the inner and outer pipes. The surface 38 may take any of numerous shapes to permit the flow of fluid through the annulus. For example, the surface 38 may take the shape of a semi-circle as indicated in phantom lines in FIG. 1. The distal ends of the lower half 14 are each defined by a flat surface 40 for seating against a respective flange portion 28 of the upper half 12. A threaded aperture 42 is formed within each flat surface 40 for receiving the threaded portion of a respective fastener 20 to clamp the upper and lower halves together around the primary pipe A. As with the upper half 12, the transition points between the various surfaces of the lower half 14 are each preferably defined by a smooth radius to prevent localized stress under load.

The upper and lower halves 12 and 14 may be constructed of any suitable material, including metal, reinforced-thermosetting plastic, or thermoplastic. The upper and lower halves 12 and 14 may also include recesses 44 formed in the side surfaces, as indicated by phantom lines in FIG. 2. The recesses 44 are particularly suitable when the halves 12 and 14 are formed by injection molding, resin-transfer molding, compression molding, or casting, for example. The recesses 44 not only result in the use of less material for the halves 12 and 14, but can also increase the overall strength of the centering support 10 by forming a ribbed configuration. The recesses 44 are dimensioned in a manner known to those of ordinary skill in the art so as to leave sufficient wall thickness adjacent the threaded apertures 42 to avoid failure.

In FIG. 3, another embodiment of the present invention is illustrated in which the centering support 10 is formed by two upper halves 12 which can be coupled together on an inner pipe A. The two upper halves 12 are each the same as the upper half 12 described above in connection with FIGS. 1 and 2, and therefore like reference numerals are used to indicate like elements. In this embodiment of the present invention, the adjacent flange portions 20 are coupled together by bolts extending through the aligned apertures 30 and secured in place by respective nuts. One advantage of this embodiment of the present invention is that it is only necessary to manufacture the upper half 12, thus reducing the overall cost of the double-containment piping system.

In FIG. 4 another embodiment of the present invention is illustrated, in which two lower halves 14 are coupled together to form the centering support 10. In this embodiment of the present invention each lower half 14 is essentially the same as the lower half described above in connection with FIG. 1, and therefore like reference numerals are used to indicate like elements.

The two halves 14 differ only in that the top half has counter-sunk holes 45 defined in the surface 36 to receive the fasteners 20, and a cut-out 34 rather than a flat 38. The other half 14 has corresponding threaded holes 42, as described above, for receiving the threaded portions of the fasteners to couple the two halves together onto the inner pipe. This centering support is similarly advantageous in that because the two halves are very similar in construction, the overall complexity, and thus cost of the centering support is reduced.

Figure 5:
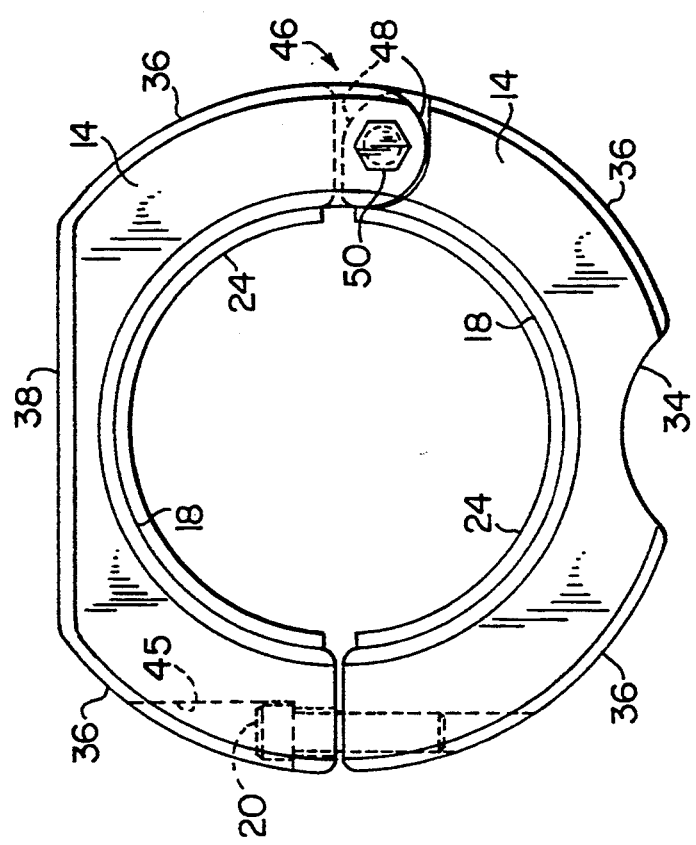
FIG. 5 is a front plan view of another centering support embodying the present invention in which the two halves of the centering support are coupled together by a hinge assembly.

In FIGS. 5 and 6 another embodiment of the present invention is illustrated which is similar to the embodiment of FIG. 4, and therefore like reference numerals are used to indicate like elements. The embodiment of FIGS. 5 and 6 differs from the embodiment of FIG. 4 essentially in that the two halves 14 are coupled together on one end by a hinge assembly 46, and coupled together on the other end by a fastener 20. The hinge assembly 46 is formed by a pair of lobes 48, each being formed on one end of each half 14, and which are coupled together by a hinge fastener 50. Thus, the centering support can be opened by moving the two halves relative to each other about the hinge assembly 46 to fit the support over the inner pipe. The centering support can then be firmly coupled to the inner pipe by tightening the fastener 20. As will be recognized by those skilled in the art, numerous different hinge configurations may be employed. One advantage of this embodiment of the present invention, is that the time required for assembly of the centering support to the primary pipe is reduced because only one fastener is required to attach the centering support to the primary pipe.

One advantage of the centering support of the present invention is that it can be used to electrically isolate the primary pipe A from the outer pipe B, or from other components of the double-containment piping system. For example, if the primary pipe A and outer pipe B are metal, the centering support 10 can be made from a non-metallic material, such as a thermosetting plastic, and thus can effectively electrically isolate the primary pipe from the outer pipe. With prior centering support devices which require welding or otherwise bonding of the centering support to the inner pipe, this advantage cannot be achieved. In the system of the present invention, because the two halves are simply mechanically coupled together on the inner pipe, electrical isolation can be easily and inexpensively achieved between the inner and outer pipes.

Another advantage of the centering support of the present invention is that because the inside surfaces (16 and/or 18) substantially conform to the outer diameter of the inner pipe, and the two halves are mechanically coupled together, the centering support is firmly engaged with the inner pipe throughout the circumference of the inner pipe to support the inner pipe. The degree to which the centering support engages the inner pipe is selected by simply adjusting the fastener(s) 20. With prior one-piece collar-type supports, for example, this result typically cannot be achieved because the inner diameter of the collar support is inherently greater than the outer diameter of the inner pipe.

Another advantage of the centering support of the present invention is that the support does not have to be welded or otherwise bonded to either the inner or outer pipe as with prior centering supports for double-containment piping systems. Rather, the centering support of the present invention is simply mechanically coupled to the primary pipe by tightening the fasteners, which in turn drives the two halves together into firm engagement with the entire circumference of the inner pipe. Accordingly, it is significantly easier and faster to assemble a double-containment piping system with the centering supports of the present invention in comparison to systems using one-piece collar supports, or supports similarly requiring welding or bonding for assembly.

It is noted that numerous variations can be made to the centering support 10 that are within the scope of the present invention. For example, the particular shape and location of the cut-outs to permit the flow of air or the drainage of fluid through the annulus between the inner and outer pipes may be varied, along with the location of the cut-outs. For example, it may be desirable to form apertures through one or both halves to perform this same function.

It is also noted that numerous types of fastening means may be employed to couple the upper and lower halves together. Hex-head, socket-head, or allen-head fasteners are only examples of the numerous types of fasteners that may equally be employed. The particular surface configuration of the flats 26 may also be varied as long as they are shaped to permit insertion of a socket wrench, or other type of tool, for tightening the fasteners 20. For example, the flats 26 may be formed with a curved surface configuration.

We claim:

1. A centering support for a double containment pipe assembly including an inner pipe within an outer pipe, comprising a first half defining a first surface substantially conforming to the curvature of the outer surface of the inner pipe, a second half defining a second surface substantially conforming to the curvature of the outer surface of the inner pipe, a layer of resilient material seated on at least one of the first and second surfaces, wherein the first and second surfaces are adapted for mounting on opposite sides of the inner pipe relative to each other on the outside surface of the inner pipe, and at least one fastening member for coupling the first and second halves together to mount the centering support to the inner pipe.

2. A centering support as defined in claim 1, wherein the first and second surfaces are substantially defined by a first radius slightly greater than the radius of the outside surface of the inner pipe.

3. A centering support as defined in claim 1, wherein the first half further defines a third surface substantially conforming to the curvature of the inside surface of the outer pipe, and the second half further defines a fourth surface substantially conforming to the curvature of the inside surface of the outer pipe.

4. A centering support as defined in claim 3, wherein at least one of the third and fourth surfaces includes a portion spaced away from the inside surface of the outer pipe for air flow or drainage through an annulus between the inner and outer pipes.

5. A centering support as defined in claim 1, wherein at least one of the first and second halves includes at least one flange portion for receiving the at least one fastening member for coupling the first and second halves together on the inner pipe.

6. A centering support as defined in claim 5, wherein a substantially flat portion is defined adjacent the at least one flange portion to facilitate insertion of a tool to manipulate the at least one fastening member.

7. A centering support as defined in claim 5, wherein at least one of the first and second halves includes two flange portions, each being located on a distal end of the respective half for receiving a fastening member for coupling the first and second halves together on the inner pipe.

8. A centering support as defined in claim 1, wherein the layer of resilient material is inserted between both the first and second surfaces and the inner pipe to facilitate firmly engaging the centering support to the inner pipe.

9. A centering support as defined in claim 1, wherein at least one half is generally semi-circular in shape.

10. A centering support as defined in claim 9, wherein the at least one half semi-circular in shape defines an aperture extending through at least one distal end for receiving the at least one fastening member for coupling the first and second halves together on the inner pipe.

11. A centering support as defined in claim 1, wherein the first and second halves are coupled together on one end by a hinge member and coupled together on the other end by the at least one fastening member.

12. A centering support for a double containment pipe assembly including an inner pipe within an outer pipe, comprising a first half defining a first surface substantially conforming to the curvature of the outer surface of the inner pipe, a second half defining a second surface substantially conforming to the curvature of the outer surface of the inner pipe, wherein the first and second halves are adapted for mounting on opposite sides of the inner pipe relative to each other on the outside surface of the inner pipe, and a layer of resilient material seated on at least one of the first and second surfaces, and wherein at least one half has a generally omega-shape defined by a pair of first substantially flat surfaces located on opposite sides of the respective half relative to each other, a curved surface located between the first substantially flat surfaces and defining a curvature substantially conforming to the curvature of an inside surface of the outer pipe, and a pair of second substantially flat surfaces, each forming a flange and being located adjacent to a respective first flat surface and oriented substantially perpendicular to the respective first flat surface.

13. A double-containment pipe assembly including an inner pipe located within an outer pipe, and a centering support coupled to the inner pipe to support the inner pipe within the outer pipe, the centering support including a first half and a separate second half, each half defining an inside surface substantially conforming to the curvature of an outside surface of the inner pipe, an outer surface substantially conforming to the curvature of an inside surface of the outer pipe, a layer of resilient material seated between at least one of the inside surfaces and the outside surface of the inner pipe, and means for mechanically coupling the first and second halves together on the inner pipe to support the inner pipe within the outer pipe.

14. A double-containment pipe assembly as defined in claim 13, wherein the means for mechanically coupling includes a fastener for coupling the first and second halves together.

15. A double containment pipe assembly as defined in claim 13, wherein at least one of the first and second halves includes a flange portion for receiving the means for mechanically coupling the first and second halves together.

16. A double-containment pipe assembly as defined in claim 15, wherein the at least one half further includes a surface adjacent the flange portion defining a space above the flange portion for insertion of a tool to manipulate the means for mechanically coupling.

17. A double-containment pipe assembly as defined in claim 13, further including a hinge assembly coupling the first and second halves together on one end and permitting movement of the first and second halves relative to each other about the hinge assembly to fit the first and second halves over the inner pipe, the other end of the first and second halves being coupled together by the means for mechanically coupling.

18. A double-containment pipe assembly as defined in claim 13, wherein resilient material is seated between the inside surfaces of both the first and second halves and the inner pipe to facilitate firmly engaging the first and second halves together on the inner pipe.

19. A double-containment pipe assembly as defined in claim 13, wherein at least one of the outer surfaces defines a portion spaced away from an inside surface of the outer pipe to permit drainage of fluid and/or the flow of air through an annulus between the inner and outer pipes.

20. A double-containment pipe assembly as defined in claim 13, wherein the means for mechanically coupling includes a fastener defining a threaded portion, and the first half defines an aperture extending through a distal end of the first half for receiving the fastener, and the second half defines a threaded aperture in a distal end of the second half for receiving the threaded portion of the fastener to couple the first and second halves together on the inner pipe.

* * * * *